US010672535B2

(12) United States Patent
Slevin et al.

(10) Patent No.: US 10,672,535 B2
(45) Date of Patent: *Jun. 2, 2020

(54) WIRE SHEATHING AND INSULATION COMPOSITIONS

(71) Applicants: AEI Compounds Ltd., Sandwich, Kent (GB); SACO AEI Polymers, Inc., Sheboygan, WI (US)

(72) Inventors: Mike Edward Slevin, Chartham (GB); David Geraint Roberts, Sheboygan Falls, WI (US)

(73) Assignees: SACO AEI Polymers, Inc., Sheboygan, WI (US); AEI Compounds Ltd., Sandwich, Kent (GB)

( * ) Notice: Subject to any disclaimer, the term of this patent is extended or adjusted under 35 U.S.C. 154(b) by 159 days.

This patent is subject to a terminal disclaimer.

(21) Appl. No.: 15/903,716

(22) Filed: Feb. 23, 2018

(65) Prior Publication Data
US 2018/0254125 A1  Sep. 6, 2018

Related U.S. Application Data

(60) Provisional application No. 62/465,509, filed on Mar. 1, 2017.

(51) Int. Cl.
| H01B 7/295 | (2006.01) |
| H01B 3/44 | (2006.01) |
| C08L 23/08 | (2006.01) |
| C08G 81/02 | (2006.01) |
| C08K 3/016 | (2018.01) |
| C08K 3/22 | (2006.01) |
| C08F 283/12 | (2006.01) |
| C08F 210/16 | (2006.01) |

(52) U.S. Cl.
CPC .......... *H01B 7/295* (2013.01); *C08F 210/16* (2013.01); *C08F 283/128* (2013.01); *C08G 81/024* (2013.01); *C08K 3/016* (2018.01); *C08K 3/2279* (2013.01); *C08L 23/0815* (2013.01); *H01B 3/441* (2013.01); *C08K 2003/2282* (2013.01); *C08L 2201/02* (2013.01); *C08L 2203/202* (2013.01); *C08L 2205/025* (2013.01); *C08L 2205/03* (2013.01); *C08L 2207/062* (2013.01); *C08L 2207/066* (2013.01)

(58) Field of Classification Search
CPC ...... H01B 7/295; H01B 3/441; C08G 81/024; C08K 3/016; C08K 3/2279; C08K 2003/2282; C08F 283/128; C08F 210/16; C08L 2207/441; C08L 23/0815; C08L 2205/03; C08L 2205/025; C08L 2203/202; C08L 2201/02; C08L 2205/202; C08L 2207/062; C08L 2207/066

See application file for complete search history.

(56) References Cited

U.S. PATENT DOCUMENTS

| 4,732,939 | A | 3/1988 | Hoshi et al. |
| 4,921,916 | A | 4/1990 | Howell et al. |
| 4,941,729 | A | 7/1990 | Hardin et al. |
| 5,112,919 | A | 5/1992 | Furrer et al. |
| 5,194,184 | A | * | 3/1993 | Takeyama ................ C08J 5/043 |
| | | | | 252/609 |
| 5,284,889 | A | 2/1994 | Pyun et al. |
| 5,312,861 | A | 5/1994 | Meverden et al. |
| 5,401,787 | A | 5/1995 | Tonyali |
| 5,474,602 | A | 12/1995 | Brown et al. |
| 5,883,144 | A | 3/1999 | Bambara et al. |
| 5,889,087 | A | 3/1999 | Hayashi et al. |
| 5,986,028 | A | 11/1999 | Lai et al. |
| 6,025,424 | A | 2/2000 | Katsuki et al. |
| 6,043,728 | A | 3/2000 | Ida et al. |
| 6,495,760 | B1 | 12/2002 | Castellani et al. |
| 6,552,112 | B1 | 4/2003 | Redondo et al. |
| 6,676,920 | B1 | 1/2004 | Oishi et al. |
| 6,703,435 | B2 | 3/2004 | Barioz |
| 6,750,282 | B1 | 6/2004 | Schall et al. |
| 6,864,323 | B2 | 3/2005 | Schlosser et al. |
| 6,894,101 | B2 | 5/2005 | Paul et al. |
| 6,924,031 | B2 | 8/2005 | Grizante Redondo et al. |
| 6,951,896 | B2 | 10/2005 | Ottenheijm |
| 7,196,130 | B2 | 3/2007 | Uehara et al. |
| 7,221,841 | B2 | 5/2007 | Chase et al. |
| 7,232,856 | B1 | 6/2007 | Campbell et al. |

(Continued)

FOREIGN PATENT DOCUMENTS

| CN | 101 475 716 A | 7/2009 |
| CN | 102 585 322 A | 7/2012 |

(Continued)

OTHER PUBLICATIONS

International Search Report and Written Opinion regarding International Appl. No. PCT/US2018/019452, dated May 8, 2018, 13 pages.
Azizi, H. et al., Silane crosslinking of polyethylene: The effects of EVA, ATH and Sb2O3 on properties of the production of continuous grafting of LDPE, eXPRESS Polymers Letters 1(6), pp. 378-384, Jun. 2007.
Baillet, C. et al., The Combustion of Polyolefins Filled with Metallic Hydroxides and Antimony Trioxide, Polymer Degradation and Stability, 30, pp. 89-99, 1990 Elsevier Science Publishers Ltd., England.
English Abstract of CN 101508806 A, published Aug. 19, 2009, Shanghai Electrical Cable Research Institute, 1 pp.

(Continued)

*Primary Examiner* — Andrew J. Oyer
(74) *Attorney, Agent, or Firm* — Foley & Lardner LLP

(57) ABSTRACT

Halogen-free polymer composite materials, which are commonly for use in sheathing and insulation applications for wire and cable, are provided. The composite materials include a polymeric blend, which includes ethylene/α-olefin copolymer and polyolefin, a hydrated metal oxide flame-retardant, such as hydrated magnesium oxide, and an antimony compound. In some instances, the polymeric blend may include an olefin/unsaturated ester copolymer.

35 Claims, No Drawings

(56) References Cited

U.S. PATENT DOCUMENTS

| | | | |
|---|---|---|---|
| 7,304,245 | B2 | 12/2007 | Alexander et al. |
| 7,652,090 | B2 | 1/2010 | Alexander et al. |
| 7,902,273 | B2 | 3/2011 | Kambe |
| 7,943,694 | B2 | 5/2011 | Varnhorn et al. |
| 8,129,619 | B2 | 3/2012 | Moriuchi et al. |
| 8,494,326 | B2 | 7/2013 | Consonni et al. |
| 8,525,028 | B2 | 9/2013 | Cree et al. |
| 8,703,288 | B2 | 4/2014 | Clancy |
| 8,895,857 | B2 | 11/2014 | Shiraki et al. |
| 9,318,240 | B2 | 4/2016 | Yan et al. |
| 2003/0114604 | A1 | 6/2003 | Schlosser et al. |
| 2003/0134969 | A1 | 7/2003 | Schlosser et al. |
| 2005/0131129 | A1 | 6/2005 | Uehara et al. |
| 2008/0311328 | A1 | 12/2008 | Kimura |
| 2009/0238957 | A1* | 9/2009 | Clancy .................. C08L 23/02 427/117 |
| 2010/0209705 | A1 | 8/2010 | Lin et al. |
| 2010/0282489 | A1 | 11/2010 | Cree et al. |
| 2011/0056728 | A1 | 3/2011 | Shiraki et al. |
| 2016/0260524 | A1 | 9/2016 | Clancy et al. |
| 2017/0233564 | A1 | 8/2017 | Li et al. |

FOREIGN PATENT DOCUMENTS

| | | |
|---|---|---|
| EP | 0245938 A2 | 11/1987 |
| EP | 0365289 A2 | 4/1990 |
| EP | 1 116 244 B1 | 12/2002 |
| EP | 1 524 294 A1 | 4/2005 |
| WO | WO-00/19452 A1 | 4/2000 |
| WO | WO-2009/042387 A1 | 4/2009 |
| WO | WO-2009/097410 A1 | 8/2009 |

OTHER PUBLICATIONS

Gilman et al., "Nanocomposites: A Revolutionary New Flame Retardant Approach," SAMPE Journal, vol. 33 No. 4, 1997, pp. 40-46.

International Search Report and Written Opinion for PCT/IB2016/05694, dated Oct. 24, 2016, 8 pages.

Stryczek et al., New Low Smoke Zero Halogen Tray Cable Jacket Materials designed for Balance of Cost, Performance and Enhanced Fire Resistance, Proceedings of the 63rd International Wire & Cable Symposium, pp. 713-717 (Feb. 2015); http://assets.conferencespot.org/fileserver/file/322619/filename/089_P-22.pdf.

\* cited by examiner

WIRE SHEATHING AND INSULATION COMPOSITIONS

CROSS-REFERENCE TO RELATED APPLICATIONS

This application claims priority to U.S. Provisional Application Ser. No. 62/465,509, filed Mar. 1, 2017, the content of which is incorporated by reference herein in its entirety.

BACKGROUND

Polymer composite materials are used in the wire and cable industry to provide insulation and sheathing of electrical conductors. Such materials must often satisfy a complicated variety of electrical, mechanical performance and fire requirements, which depend on the particular type of environment where the material is designed to be used.

In recent years, the use of materials containing a halogen, such as bromine or chlorine, has been limited in many countries. Gases evolved during burning can be corrosive, toxic, harmful & generate dense smoke obscuring escape in fire situations. The potential advantages of halogen-free cables may include reduced environmental and corrosive impact, as well as a potential reduction in smoke and/or toxic gas generation.

There is continuing a need to produce polymer composite materials for wire and cable applications that are substantially free of halogen-containing compounds while maintaining the necessary flame retardant and of physical attributes of the cable sheathing materials.

SUMMARY

The present application relates generally to the field of materials which can be used as sheathing materials in wire and cable applications. The sheathing materials include a polymeric blend, which includes ethylene/α-olefin copolymer and polyolefin (e.g., polyethylene), a hydrated metal oxide flame-retardant, and an antimony compound. The composites typically include a hydrated metal oxide flame retardant, such as a magnesium, calcium, zinc and/or aluminum hydroxide, together with the antimony compound. In some instances, the sheathing materials may also include an olefin/unsaturated ester copolymer, such as an ethylene/vinyl acetate copolymer.

The sheathing materials may desirably be crosslinkable, halogen-free polymer composites. The present composites may be designed to be crosslinked by a conventional method known to those of skill in the art. Common crosslinking methods include moisture-cure methods, free radical cure methods and irradiation based methods (e.g., electron beam methods).

In one embodiment, the present sheathing material is a halogen free polymer composite which includes (A) 100 parts by weight polymer material, which includes about 30 to 75 wt % ethylene/α-olefin copolymer; and about 25 to 60 wt % polyolefin; (B) about 50 to 175 parts by weight hydrated metal oxide flame-retardant; and (C) about 20 to 100 parts by weight antimony compound. In some instances, the polymer material may also include up to about 30 wt % of an olefin/unsaturated ester copolymer, e.g., ethylene/vinyl acetate copolymer and/or an ethylene/alkyl (meth)acrylate copolymer, such as an ethylene/butyl acrylate copolymer. The composite commonly includes at least about 125 parts by weight total of the hydrated metal oxide flame-retardant and the antimony compound per 100 parts by weight of the polymer material. The total amount of the hydrated metal oxide and antimony compound is typically about 50-70 wt % of the composition.

In one embodiment, the present sheathing material is a halogen free polymer composite which includes (A) 100 parts by weight polymer material, which includes ethylene/α-olefin copolymer; and polyolefin; (B) about 50 to 175 parts by weight hydrated metal oxide flame-retardant; and (C) about 50 to 100 parts by weight antimony compound. For example, the polymer composite may include 100 parts by weight of the polymer material, which includes about 50 to 75 wt % ethylene/α-olefin copolymer, e.g., an ethylene/α-octene plastomer, and about 25 to 50 wt % polyethylene, e.g., a linear low density polyethylene (LLDPE), about 75 to 125 parts by weight magnesium hydroxide and about 50 to 100 parts by weight antimony trioxide. In other embodiments, the polymer material may include about 20 to 40 wt % ethylene/α-olefin copolymer, e.g., an ethylene/α-octene plastomer, about 20 to 40 wt % of an olefin block copolymer, e.g., ethylene/α-olefin-polyethylene block copolymer, and about 25 to 50 wt % of a polyethylene.

In another aspect, the present composition may be a halogen free polymer composite, which includes about 10 to 25 wt % ethylene/α-olefin copolymer; about 10 to 15 wt % polyolefin; about 20 to 50 wt % hydrated metal oxide flame-retardant; and about 20 to 35 wt % antimony compound. For example, the polymer composite may include about 5 to 15 wt % ethylene/α-olefin plastomer; about 10 to 15 wt % polyethylene; about 20 to 50 wt % magnesium hydroxide; and about 20 to 35 wt % antimony compound. In one suitable example, the polymer composite includes about 10 to 25 wt % ethylene/α-octene plastomer; about 10 to 15 wt % linear low density polyethylene; about 20 to 50 wt % magnesium hydroxide; and about 20 to 35 wt % antimony trioxide. In other examples, the polymer composite may include about 5 to 15 wt % ethylene/α-olefin plastomer; about 5 to 15 wt % ethylene/α-olefin-polyethylene block copolymer; about 10 to 15 wt % polyethylene; about 20 to 50 wt % magnesium hydroxide; and about 20 to 35 wt % antimony compound. In a suitable example, the polymer composite includes about 5 to 15 wt % ethylene/α-octene plastomer; about 5 to 15 wt % ethylene/α-olefin-polyethylene block copolymer; about 10 to 15 wt % linear low density polyethylene; about 20 to 50 wt % magnesium hydroxide; and about 20 to 35 wt % antimony trioxide.

In another aspect, the present composition may be a halogen free polymer composite, which includes (A) 100 parts by weight polymer material, which includes about 30 to 60 wt % ethylene/α-olefin copolymer; and about 30 to 60 wt % polyethylene; (B) about 50 to 150 parts by weight hydrated metal oxide flame-retardant; and (C) about 30 to 75 parts by weight antimony compound. In some instances, the polymer material may also include up to about 30 wt % of an olefin/unsaturated ester copolymer. Commonly, the polymer composite includes at least about 125 parts by weight total of the hydrated metal oxide flame-retardant and the antimony compound per 100 parts of the polymer material. The total of the hydrated metal oxide and the antimony compound typically constitutes about 50-70 wt % of the composition. For example, the polymer composite may include (A) 100 parts by weight polymer material, which includes about 40 to 60 wt % ethylene/α-octene plastomer and about 40 to 60 wt % linear low density polyethylene; (B) about 75 to 125 parts by weight magnesium dihydroxide; and (C) about 35 to 50 parts by weight antimony trioxide. In other instances, the polymer composite may include (A) 100 parts by weight polymer material, which includes about 30 to 50 wt % ethylene/α-octene plastomer; about 30 to 50 wt % linear low density polyethylene; and about 5 to 25 wt % ethylene/vinyl acetate copolymer; (B) about 75 to 125 parts by weight magnesium dihydroxide; and (C) about 35 to 50 parts by weight antimony trioxide.

In another aspect, the present composition may be a halogen free polymer composite, which includes about 10 to 25 wt % ethylene/α-olefin copolymer; about 10 to 25 wt % polyethylene; about 0 to 15 wt % olefin/unsaturated ester copolymer; about 20 to 50 wt % hydrated metal oxide flame-retardant; and about 20 to 35 wt % antimony compound. The total of the hydrated metal oxide and the antimony compound typically constitutes about 50-70 wt % of the composition. For example, the polymer composite may include about 10 to 25 wt % ethylene/α-octene plastomer; about 10 to 25 wt % linear low density polyethylene; about 0 to 15 wt % ethylene/vinyl acetate copolymer; about 20 to 50 wt % magnesium dihydroxide; and about 20 to 35 wt % antimony trioxide.

In some embodiments, the crosslinkable polymer composition may be a moisture curable, halogen-free polymer composite which includes a polymer component, antimony compound and metal hydroxide flame retardant. The metal hydroxide flame retardant typically includes magnesium hydroxide and/or aluminum hydroxide. The polymer component may include one or more of a silane-grafted ethylene/α-olefin copolymer (e.g., a silane-grafted ethylene/α-olefin plastomer) and a silane-grafted thermoplastic polyolefin (e.g., a silane-grafted polyethylene). The polymer component may optionally include ethylene/α-olefin copolymer and a thermoplastic polyolefin, such as polyethylene.

DETAILED DESCRIPTION

The present application provides halogen-free polymer composite compositions, which typically exhibit excellent electrical and physical properties, for use in wire and cable applications. The composite materials include a polymer material, an antimony compound and an inorganic flame retardant, such as a hydrated metal oxide flame-retardant. Very often, the polymer material in the composite material is crosslinkable. The halogen-free sheathing composition typically includes about 50 to about 175 parts by weight of the hydrated metal oxide flame retardant and about 30 to about 100 parts by weight of the antimony compound per 100 parts by weight of polymer material. Typically, the polymer material includes a blend of a thermoplastic olefin, such as polyethylene, and an ethylene/α-olefin copolymer, e.g., an ethylene/α-olefin plastomer, and optionally an olefin block copolymer, e.g., ethylene/α-olefin-polyethylene block copolymer. In some instances, the blend of polymer material may also include an olefin/unsaturated ester copolymer, such as an ethylene/alkyl (meth)acrylate copolymer and/or an ethylene/vinyl acetate copolymer.

The flame retardant material includes metal hydroxide flame retardant, such as a magnesium, calcium, zinc and/or aluminum hydroxide. The flame retardant material typically includes magnesium hydroxide and/or aluminum hydroxide, which commonly has an average particle size no more than about 3 microns. For example, the flame retardant material may include magnesium hydroxide, such as a precipitated magnesium dihydroxide (MDH) having an average particle size of no more than about 2 microns. In some embodiments, the magnesium dihydroxide may be in the form of hexagonal platelets having average particle size of about 0.8-2 microns. In some embodiments, it may be advantageous to use silane-coated particulate magnesium dihydroxide, e.g., precipitated magnesium dihydroxide having a vinyl silane coating. Quite commonly, the present sheathing compositions include about 50 to 175 parts by weight of the hydrated metal oxide flame retardant, e.g., hydrated magnesium oxide, per 100 parts by weight of polymer material.

The antimony compound may include antimony trioxide, antimony pentoxide, antimony tetroxide, sodium antimonate and/or antimony tartrate. Typically, the antimony compound includes antimony trioxide. In many instances, the hydrated magnesium oxide may include magnesium dihydroxide in the form of ground brucite. The antimony compound may be in granular form, e.g., as pellets or as microgranules, containing a thermoplastic polymer with very high concentration of antimony compound (e.g., up to 90% antimony trioxide). Such granular products may be referred to as a "masterbatch" of an antimony compound, e.g., a dispersion of particles of the antimony compound in a polymeric support. Suitable examples include granular materials containing up to about 80% of an antimony compound, such as antimony trioxide, compounded with EVA and granular materials containing about 80-90% of an antimony compound, such as antimony trioxide, compounded with polyethylene. Masterbatches containing about 80-90% antimony trioxide compounded with polyethylene can be particularly suitable for use in producing the present polymer composites. Quite commonly, the present sheathing compositions include about 30 to 100 parts by weight antimony compound per 100 parts by weight of polymer material.

In some embodiments, it may be advantageous for the flame retardant material to include a surface treated hydrated metal oxide flame-retardant. For example, the flame retardant material may include hydrated metal oxide which has been surface treated with an organosilane, e.g., magnesium dihydroxide, aluminum monohydrate and/or aluminum trihydrate which has been surface treated with a vinyl silane and/or an oligomeric vinyl silane. Suitable vinyl silanes include vinyl trialkoxysilanes, e.g., vinyl trimethoxysilane (VTMOS) and/or vinyl triethoxysilane (VTEOS). Suitable oligomeric vinyl silanes include an oligomer of an alkyltrialkoxy silane (e.g., butyltriethoxy silane, propyltriethoxy silane, propyltrimethoxy silane and/or butyltrimethoxy silane) and a vinyl trialkoxysilane. Such oligomers typically have an effective vinyl content of about 5 to 25 wt. %.

Suitable polyolefins used in the polymer material may include polyethylene, such as a linear low density polyethylene. In many instances, the polyolefin component may suitably include a linear low density polyethylene having a melt flow rate (as determined pursuant to ASTM D 1238) of about 1-5 g/10 min (2.16 kg @ 190° C.), a Vicat softening point of about 90-110° C. (as determined pursuant to ASTM D 1525), an elongation at break of at least about 500% (as determined pursuant to ASTM D 882) and a density of about 0.90 to 0.94 kg/m$^3$ (as determined pursuant to ASTM D 1238). In many embodiments, the polymer material in the composite may include about 30 to 50 wt. % polyethylene, e.g., linear low density polyethylene. Quite commonly, the polyethylene may constitute about 10 to 15 wt. % of the polymer composite.

The ethylene/α-olefin copolymer may commonly include an ethylene/α-olefin plastomer, such as an ethylene/α-octene plastomer. A suitable ethylene/α-octene plastomer may have an elongation at break of at least about 600% (as determined pursuant to ISO 527-2) and an tensile strength of at least about 5 MPa (725 psi) (as determined pursuant to ASTM D 628). Such an ethylene/α-octene plastomer may have a melt flow rate (as determined pursuant to ISO 1133) of about 1-40 g/10 min (2.16 kg @ 190° C.) and/or a melting point of about 70-110° C. (as determined via DSC pursuant to ASTM D 3418). In some instances, the ethylene/α-olefin copolymer suitably include an ethylene/α-octene plastomer have a melt flow rate of about 1-40 g/10 min (2.16 kg @ 190° C.), a melting point of about 70-80° C., tensile strength of about 5 to 25 MPa (about 700 to 3,600 psi) and an elongation at break of about 800% to 1,100%. In some instances, the ethylene/α-olefin copolymer suitably include an ethylene/α-octene plastomer have a melt flow rate of about 20-40 g/10 min (2.16 kg @ 190° C.), a melting point of about 70-80° C., tensile strength of about 5 to 10 MPa (about 700 to 1,500 psi) and an elongation at break of about 800% to 1,000%. Suitable ethylene/α-octene plastomers may have a density of about 0.85 to 0.94 kg/m$^3$ and, commonly, about 0.86 to 0.90 kg/m$^3$. In many embodiments, the polymer material in the composite may include about 50 to 70 wt. % of the ethylene/α-olefin copolymer polyethylene, e.g., an ethylene/α-octene plastomer. Quite commonly, the ethylene/α-olefin copolymer may constitute about 15 to 25 wt. % of the polymer composite.

In some embodiments, the polymer material in the present composite may an olefin block copolymer. The olefin block copolymer may suitably include an ethylene/α-olefin-polyethylene block copolymer (e.g., an ethylene/α-octene-polyethylene block copolymer). Suitable ethylene/α-olefin-polyethylene block copolymers may have an elongation at break of at least about 1,200% (as determined pursuant to ASTM D 628) and a tensile strength at break of at least about 2 MPa (300 psi) (as determined pursuant to ASTM D 628). Such ethylene/α-olefin-polyethylene block copolymers may have a melt index (as determined pursuant to ASTM D1238) of about 10-20 g/10 min (2.16 kg @ 190° C.) and/or a surface hardness (Shore A) of about 60-80 (as determined pursuant to ASTM D 2240). Typically, suitable ethylene/α-olefin-polyethylene block copolymers may have a melting point of about 115-125° C. (as determined via DSC pursuant to ASTM D 3418). In some embodiments, the olefin block copolymer may include an ethylene/α-octene-HDPE block copolymer. In many embodiments, the polymer material in the composite may include about 20 to 40 wt. % of the olefin block copolymer, e.g., an ethylene/α-olefin-polyethylene block copolymer. Quite commonly, the olefin block copolymer may constitute about 5 to 15 wt. % of the polymer composite. When the polymeric material includes olefin block copolymer, it is often present in combination with a similar amount.

In many instances, the polymer material in the present composites is substantially free of oxygenated polymers and copolymers, i.e., the polymer material is essentially constituted entirely of polymeric materials that do not contain any oxygen-containing subunits. In some embodiments, however, in order to achieve certain physical properties it may be advantageous to include minor amounts (e.g., up to about 30 wt. % of the polymer components) of an olefin/unsaturated ester copolymer as part of the polymer material in the composite. Ethylene/vinyl acetate copolymers and ethylene/alkyl (meth)acrylate copolymers, such as ethylene/butyl acrylate copolymers, ethylene/propyl acrylate copolymers and ethylene/ethyl methacrylate copolymers, are examples of olefin/unsaturated ester copolymer which may suitably be included in the polymer composites.

The ethylene/vinyl acetate (EVA) copolymers are typically a random ethylene/vinyl acetate copolymer. The ethylene/vinyl acetate copolymer may suitably have a vinyl acetate monomer content of about 15-30%. Such ethylene/vinyl acetate copolymers may have a melt flow index (MFI as determined pursuant to ISO 1133) of about 1-5 g/10 min (@ 190° C.) and a density of about 0.94-0.96 g/cm$^3$. Such EVA copolymers may suitably have a Vicat softening point of about 40-55° C. (as determined pursuant to ISO 306) and/or a melting point of about 65-85° C. (as determined via DSC pursuant to ISO 3146).

The present polymer composites may suitably contain a number of optional ingredients. For example, the composites may include anti-oxidant(s), a UV protector/light stabilizer, colorant, chalk and/or optional processing aids, such as an UHMW silicone, which may be dispersed in a thermoplastic polyolefin.

In applications where a moisture-curable sheathing material is desired, the composition typically includes a moisture-curable thermoplastic polymer together with the flame retardant material. Such a crosslinkable thermoplastic polymer is desirably curable by exposure to moisture, e.g., by the inclusion of moisture curable silane functionality in the thermoplastic polymer, such as by including a silane grafted polymer in an crosslinkable thermoplastic polymer blend. This may be accomplished by grafting silane functional groups onto one or more thermoplastic polymers in the composite. For example, a crosslinkable thermoplastic polymer blend may include ethylene/α-olefin copolymer (e.g., an ethylene/α-olefin plastomer), olefin block copolymer (e.g., an ethylene/α-octene-polyethylene block copolymer) and/or a thermoplastic polyolefin (such as a polyethylene), which have been grafted with silane functional groups, e.g., through free radical initiated reaction with a vinyl alkoxysilane, such as a vinyltrialkoxysilane (e.g., VTMOS or VTEOS). In some instances, the crosslinkable thermoplastic polymer blend may also include unmodified ethylene/α-olefin copolymer, olefin block copolymer and/or thermoplastic polyolefin.

The silane grafted polymer blends may be formed by combining a polyethylene with an ethylene copolymer plastomer, such as an ethylene/α-olefin plastomer and, optionally, an ethylene/α-olefin-polyethylene block copolymer. The mixture may also include other additives, such as antioxidant and/or chalk ($CaCO_3$). Vinyl silane, e.g., a vinyl trialkoxysilane such as vinyl trimethoxysilane and/or vinyl triethoxysilane, and organic peroxide (such as dicumyl peroxide, 2,5-dimethyl-2,5-di(tert-butylperoxy)hexane or 1,1-di(tert-butylperoxy)-3,3,5-trimethylcyclohexane) may be included in the blend. The mixture may suitably be compounded in an extruder at a temperature of about 170 to 230° C. to provide the silane grafted polymer blend. The resulting blend includes silane-grafted polyethylene, silane-grafted ethylene/α-olefin plastomer and/or silane-grafted ethylene/α-olefin-polyethylene block copolymer.

The silane-grafted polymer blend may be compounded with an antimony compound, metal hydroxide flame retardant (e.g., magnesium hydroxide and/or aluminum hydroxide) and other conventional additives and then extruded to form a halogen free, flame-retardant, crosslinkable polymer composite. This may suitably be carried out by extrusion compounding the silane-grafted polymer blend, an antimony compound, metal hydroxide flame retardant and other conventional additives in an extruder, e.g., at a temperature of about 160 to 220° C. The crosslinkable polymer composite is typically UV stabilized and is curable by exposure to moist conditions. In use, the crosslinkable polymer composite is typically mixed with a crosslinking catalyst masterbatch, e.g., in a ratio of about 95:5 to 99:1 (commonly about 97:3).

The tables below provide illustrations of suitable formulations for producing crosslinkable halogen-free, flame retardant filled polymer composites according to the present application. The components listed for Silane Grafted Polymer Blend Formulation A1 can be melt processed, e.g., via extrusion, to provide Silane Grafted Polymer Blend A1. This may then be combined in the amount shown with the other ingredients listed for Flame Retardant Polymer Composite Formulation HFFR-1 in a melt processing step, e.g., via extrusion compounding, to provide a moisture-curable, crosslinkable polymer composite. Alternatively both polymer blending/grafting operation and the combination of the polymer material(s) with the other ingredients of the composite may be accomplished in a single compounding operation.

Silane Grafted Polymer Blend Formulation A1

| Component | Wt. % | Notes |
|---|---|---|
| Ethylene/α-octene plastomer | 20-70 | thermoplastic ethylene/α-octene plastomer |
| α-Olefin block copolymer | 0-40 | ethylene/α-olefin-polyethylene block copolymer |
| Polyethylene | 30-50 | typically a linear low density polyethylene |
| Vinyl Silane | 1-3 | Vinyl trialkoxysilane |
| Organic peroxide | 0.1-0.3 | Peroxide free radical initiator |

Flame Retardant Filled Polymer Composite Formulation HFFR-1

| Component | Wt. % | Notes |
|---|---|---|
| Silane Grafted Polymer Blend A1 | 25-40 | Silane-grafted polymer blend with polyethylene, ethylene/α-octene plastomer and optional, α-olefin block copolymer |
| Optional UHMW silicone | 0-2 | Typically as 50% dispersion in thermoplastic polyolefin |
| Magnesium hydroxide and/or aluminum hydroxide | 30-50 | Typically average particle size no more than 2 microns |
| Antimony compound | 15-35 | Typically antimony trioxide |
| Antioxidant | 0.5-2 | |
| Optional UV Protector/Light Stabilizer | 0-1.0 | |
| Optional colorant | 0-4 | |
| Optional processing aids | 0-5 | |

In applications where a radiation-curable sheathing material is desired, the composition typically includes a co-agent additive(s) to promote radiation curing. For example, the sheathing material may include a co-agent additives containing three or more unsaturated carbon-carbon functional groups to aid in promoting crosslinking. Suitable examples include triallyl cyanurate (TAC), trimethylolpropane trimethacrylate (TMPTA), trimethylolpropane triacrylate, and/or triallyl trimethylolpropane.

In applications where a free radical-curable sheathing material is desired, the composition typically includes a co-agent additive(s) to promote crosslinking. For example, where the sheathing material is desired for a peroxide cure via the addition of peroxide (e.g., hydrogen peroxide or an organic peroxide), co-agents such as a unsaturated polymer, e.g., a polymer which includes olefinic functional groups such as a styrene/butadiene copolymer or styrene/isoprene copolymer, may be added to the sheathing material.

EXAMPLES

The following examples illustrate more specifically the present compositions according to various embodiments described above. These examples should in no way be construed as limiting the scope of the present technology.

Example 1

Table 1 below provides an number of exemplary formulations for producing halogen-free, flame retardant filled polymer composites. The polymer components listed are typically melt processed in an initial operation, e.g., via extrusion, to provide a Polymer Blend. The Polymer Blend may then be combined in the amounts shown with the listed inorganic components in a second melt processing step, e.g., via extrusion, to provide a flame retardant polymer composite. It may be desirable to include small amounts of various additives, such as processing aid(s), antioxidant(s), UV protectant(s) and silanizing reagents (e.g., VTMOS), either in the initial mixture or added into the Polymer Blend in the second melt processing operation. Table 2 lists various properties of polymer composite formed from the formulations listed in Table 1.

TABLE 1

Illustrative Compositions

| Component (Parts by Wt) | Ex-1A | Ex-1B | Ex-1C | Ex-1D |
|---|---|---|---|---|
| Ethylene/α-octene | 60 | 60 | 60 | 60 |
| LLDPE | 40 | 40 | 40 | 40 |
| Total Polymer* | 101.4 | 101.5 | 101.5 | 101.5 |
| Other Additives** | 3.1 | 3.3 | 3.3 | 3.3 |
| Polymer MFI (dg/min) @ 2.16 kg - 190° C. | 1.1 | 1.1 | 1.1 | 1.1 |
| MDH | 108 | 90 | 85 | 60 |
| Sb$_2$O$_3$ | 25 | 50 | 50 | 72 |
| Clay | — | — | 10 | — |
| Total Inorganic | 133 | 140 | 145 | 132 |

*includes adduct with silanizing reagent (VTMOS)
**mix of processing aid(s), antioxidant(s), UV protectant

TABLE 2

| | Ex-1A | Ex-1B | Ex-1C | Ex-1D |
|---|---|---|---|---|
| MFI 21.6 kg 150° C. | 3.9 | 2.3 | 3.65 | 5.9 |
| Density | 1.442 | 1.486 | 1.495 | 1.518 |
| Cured Tape 0.6 mm | | | | |
| Tensile Strength MPa | 13.65 | 13.57 | 14.82 | 16.68 |
| Elongation % | 196 | 278 | 250 | 477 |
| Hot Set 20N @200° C. | | | | |
| Elongation % | BROKE | 10 | 20 | 20 |

Example 2

Table 3 below provides an number of exemplary formulations for producing halogen-free, flame retardant filled polymer composites. The polymer components listed are typically melt processed in an initial operation, e.g., via extrusion, to provide a Polymer Blend. The Polymer Blend may then be combined in the amounts shown with the listed inorganic components in a second melt processing step, e.g., via extrusion, to provide a flame retardant polymer composite. It may be desirable to include small amounts of various additives, such as processing aid(s), antioxidant(s), UV protectant(s) and silanizing reagents (e.g., VTMOS), either in the initial mixture or added into the Polymer Blend in the second melt processing operation. Table 4 lists various properties of polymer composite formed from the formulations listed in Table 3.

TABLE 3

Illustrative Compositions

| Component (Parts by Wt) | Ex-2A | Ex-2B | Ex-2C | Ex-2D | Ex-2E | Ex-2F | Ex-2J |
|---|---|---|---|---|---|---|---|
| Ethylene/α-octene | 60 | 60 | 60 | 60 | 60 | 60 | 60 |
| LLDPE | 40 | 40 | 40 | 40 | 40 | 40 | 40 |
| Total Polymer* | 101.4 | 101.4 | 101.4 | 101.4 | 101.4 | 101.4 | 101.4 |
| Other Additives** | 2.4 | 3.6 | 3.6 | 3.6 | 5.6 | 2.4 | 2.4 |
| MDH | 120 | 120 | 120 | 100 | 100 | 120 | 120 |
| $Sb_2O_3$ | 75 | 75 | 75 | 75 | 75 | 75 | 75 |
| Talc | — | — | — | 20 | 20 | — | — |
| Total Inorganic | 195 | 195 | 195 | 195 | 195 | 195 | 195 |

*includes adduct with silanizing reagent (VTMOS)
**mix of processing aid(s), antioxidant(s), UV protectant

TABLE 4

|  | Ex-2A | Ex-2B | Ex-2C | Ex-2D | Ex-2E | Ex-2F | Ex-2J |
|---|---|---|---|---|---|---|---|
| MFI 21.6 kg 150° C. | 4.45 | 3.65 | 6.6 | 5.5 | 9.45 | 15.3 | 9.85 |
| Density | 1.64 | 1.66 | 1.66 | 1.66 | 1.64 | 1.63 | 1.64 |
| Cured Tape 0.6 mm |  |  |  |  |  |  |  |
| Tensile Strength MPa | 17.0 | 16.2 | 14.0 | 15.0 | 14.1 | 12.8 | 13.5 |
| Elongation % | 204 | 211 | 228 | 219 | 199 | 172 | 162 |
| Hot Set 20N @200° C. |  |  |  |  |  |  |  |
| Elongation % | 25 | 20 | 20 | 20 | 15 | 15 | 30 |
| Set % | −10 | −10 | −5 | −10 | −5 | −5 | 0 |
| Cured Wire 12 AWG |  |  |  |  |  |  |  |
| Tensile Strength MPa |  | 14.06 | 13.53 | 13.03 | 13.31 |  | 13.2 |
| Elongation % |  | 146 | 160 | 134 | 191 |  | 122 |
| Hot Set 20N @200° C. |  |  |  |  |  |  |  |
| Deformation* (%) |  | 34.1 | 27.6 | 26.6 | 31.6 |  | 25 |
| VW1 - 12 AWG | — | 3P | 1P2F | 3P | 3P | — | 3F |
| Extrusion Quality tape | 10 | 10 | 10 | 8 | 8 | 9 | 10 |

*Deformation % 131° C., 500 g pursuant to UL 44 Clause 5.12

Example 3

Table 5 below provides an number of exemplary formulations for producing halogen-free, flame retardant filled polymer composites. The polymer components listed are typically melt processed in an initial operation, e.g., via extrusion, to provide a Polymer Blend. The Polymer Blend may then be combined in the amounts shown with the listed inorganic components in a second melt processing step, e.g., via extrusion, to provide a flame retardant polymer composite. It may be desirable to include small amounts of various additives, such as processing aid(s), antioxidant(s), UV protectant(s) and silanizing reagents (e.g., VTMOS), either in the initial mixture or added into the Polymer Blend in the second melt processing operation. Table 6 lists various properties of polymer composite formed from the formulations listed in Table 5.

TABLE 5

Illustrative Compositions

| Component (Parts by Wt) | Ex-3A | Ex-3B | Ex-3C | Ex-3D | Ex-3E |
|---|---|---|---|---|---|
| Ethylene/α-octene | 60 | 60 | 30 | 60 | 30 |
| Olefin block copolymer | — | — | 30 | — | 30 |
| TPE |  |  |  |  |  |
| LLDPE | 40 | 40 | 40 | 40 | 40 |
| Polymer MFI (dg/min) @ 2.16 kg - 190° C. | 1.0 | 1.2 | 2.9 | 1.0 | — |
| Total Polymer* | 101.4 | 101.4 | 101.4 | 111.4 | 101.4 |
| Other Additives*** | 3.6 | 3.6 | 3.6 | 3.6 | 3.6 |
| MDH | 120 | 120 | 120 | 120 | 120 |
| $Sb_2O_3$ | 90 | 90 | 90 | 90** | 90 |
| Total FR | 210 | 210 | 210 | 210 | 210 |

*includes adduct with silanizing reagent (VTMOS)
**as 90 wt. % dispersion in polymer
***mix of processing aid(s), antioxidant(s), UV protectant

TABLE 6

|  | Ex-3A | Ex-3B | Ex-3C | Ex-3D | Ex-3E |
|---|---|---|---|---|---|
| MFI - 21.6 kg/150° C. (g/10 min) | 2.8 | 0.6 | 1.0 | 3.4 | 1.0 |
| Density | 1.63 | 1.68 | 1.71 | 1.64 | 1.71 |
| Cured Tape 0.6 mm |  |  |  |  |  |
| Tensile Strength MPa | 16.2 | 17.0 | 18.2 | 15.7 | 15.7 |
| Elongation % | 201 | 169 | 197 | 201 | 255 |

TABLE 6-continued

|  | Ex-3A | Ex-3B | Ex-3C | Ex-3D | Ex-3E |
|---|---|---|---|---|---|
| Cured Wire 14 AWG | | | | | |
| Tensile Strength psi | | | | | 1633 |
| Elongation % | | | | | 191 |
| Hot Set 20N @200° C. | | | | | |
| Elongation % | 20 | 10 | 10 | 40 | 25 |
| Set % | 0 | 0 | 0 | 5 | 0 |
| Deformation* (%) | 18.4 | 23.0 | 25.3 | 24.9 | — |
| Extrusion Quality tape | 10 | 10 | 10 | 10 | 10 |
| VW-1 test | 1P5F | 1P5F | 3P3F | 4P2F | 9P3F |

*Deformation % 131° C., 500 g pursuant to UL 44 Clause 5.12

Example 4

Table 7 below provides an number of exemplary formulations for producing halogen-free, flame retardant filled polymer composites. The polymer components listed are typically melt processed in an initial operation, e.g., via extrusion, to provide a Polymer Blend. The Polymer Blend may then be combined in the amounts shown with the listed inorganic components in a second melt processing step, e.g., via extrusion, to provide a flame retardant polymer composite. It may be desirable to include small amounts of various additives, such as processing aid(s), antioxidant(s), UV protectant(s) and silanizing reagents (e.g., VTMOS), either in the initial mixture or added into the Polymer Blend in the second melt processing operation. Table 8 lists various properties of polymer composite formed from the formulations listed in Table 7.

TABLE 7

| | Illustrative Compositions | | | | | | | |
|---|---|---|---|---|---|---|---|---|
| Component (Parts by Wt) | A | B | C | D | E | F | G | H |
| Ethylene/α-octene | 60 | 60 | 60 | 60 | 60 | 60 | 60 | 60 |
| LLDPE | 40 | 40 | 40 | 40 | 40 | 40 | 40 | 40 |
| Total Polymer** | 101.4 | 101.4 | 101.4 | 101.4 | 101.4 | 101.4 | 101.4 | 101.4 |
| Other Additives* | 3.6 | 3.6 | 3.6 | 3.6 | 3.6 | 3.6 | 3.6 | 3.6 |
| MDH | 110 | 110 | 100 | 100 | 95 | 95 | 95 | 90 |
| Sb$_2$O$_3$ | 75 | 75 | 75 | 75 | 65 | 65 | 65 | 60 |
| Talc | — | — | 20 | 20 | 20 | 20 | 20 | 20 |
| Clay | — | — | — | — | — | — | — | 10 |
| APP*+ | 10 | 10 | — | — | — | — | — | — |
| Silicone | — | — | — | — | — | 6 | 6 | 6 |
| Zinc borate | — | — | — | — | 15 | 15 | 5 | 5 |
| XF115*** | — | — | — | — | — | — | 10 | 10 |
| Total Inorganic | 195 | 195 | 195 | 195 | 195 | 201 | 201 | 201 |

**includes adduct with silanizing reagent (VTMOS)
*mix of processing aid(s), antioxidant(s), UV protectant
***glass frit additive
*+ammonium polyphosphate

TABLE 8

|  | Ex-4A | Ex-4B | Ex-4C | Ex-4D | Ex-4E | Ex-4F | Ex-4G | Ex-4H |
|---|---|---|---|---|---|---|---|---|
| Cured Tape 0.6 mm | | | | | | | | |
| Tensile Strength MPa | 15.8 | 13.3 | 18.1 | 17.3 | 17.9 | 14.0 | 12.8 | 18.1 |
| Elongation % | 181 | 194 | 195 | 201 | 125 | 134 | 112 | 114 |
| Hot Set 20N @200° C. | | | | | | | | |
| Elongation % | 15 | 15 | 10 | 10 | 10 | 10 | 10 | 10 |
| Set % | −10 | −10 | −10 | −10 | −10 | −10 | −10 | −10 |
| Extrusion Quality tape | 5 | 8 | 9 | 10 | 9 | 6 | 5 | 5 |
| VW-1 test | 3P | 3P | 3P | 2P1F | 3P | 3P | 3F | 3F |

Example 5

Table 9 below provides a number of exemplary formulations for producing halogen-free, flame retardant filled polymer composites. The polymer components listed are typically melt processed in an initial operation, e.g., via extrusion, to provide a Polymer Blend. The Polymer Blend may then be combined in the amounts shown with the listed inorganic components in a second melt processing step, e.g., via extrusion, to provide a flame retardant polymer composite. It may be desirable to include small amounts of various additives, such as processing aid(s), antioxidant(s), UV protectant(s) and silanizing reagents (e.g., VTMOS), either in the initial mixture or added into the Polymer Blend in the second melt processing operation. Table 10 lists various properties of polymer composite formed from the formulations listed in Table 9.

TABLE 9

Illustrative Compositions

|  | Ex-5A | Ex-5B | Ex-5C | Ex-5D | Ex-5E | Ex-5F | Ex-5G | Ex-5H | Ex-5I |
|---|---|---|---|---|---|---|---|---|---|
| Ethylene/α-octene | 60 | 60 | 60 | 60 | 60 | 60 | 60 | 60 | 60 |
| LLDPE | 40 | 40 | 40 | 40 | 40 | 40 | 40 | 40 | 40 |
| Total Polymer* | 101.4 | 101.4 | 101.4 | 101.4 | 101.6 | 101.6 | 101.6 | 101.6 | 101.6 |
| Other Additives** | 3.1 | 3.1 | 3.1 | 3.1 | 3.8 | 3.8 | 3.8 | 3.8 | 3.8 |
| MDH | 120 | 120 | 120 | 120 | 129 | 129 | 129 | 129 | 129 |
| $Sb_2O_3$ | 75 | 75 | 75 | 75 | 80 | 80 | 80 | 80 | 80 |
| Total Inorganic | 195 | 195 | 195 | 195 | 209 | 209 | 209 | 209 | 209 |

*includes adduct with silanizing reagent (VTMOS)
**mix of processing aid(s), antioxidant(s), UV protectant

TABLE 10

|  | A | B | C | D | E | F | G | H | I |
|---|---|---|---|---|---|---|---|---|---|
| MFI 21.6 kg 150° C. | 1.2 | 0.15 | 0.2 | 0.45 | 11.9 | 12.0 | 8.5 | 5.2 | 8.2 |
| Density | 1.62 | 1.62 | 1.64 | 1.63 | 1.66 | 1.65 | 1.67 | 1.66 | 1.68 |
| Cured Tape 0.6 mm | | | | | | | | | |
| Tensile Strength MPa | 13.3 | 12.3 | 14 | 18 | 10.1 | 11.0 | 9.5 | 7.7 | 8.0 |
| Elongation % | 129 | 67 | 111 | 233 | 116 | 162 | 122 | 81 | 104 |
| Hot Set 20N @ 200° C. | | | | | | | | | |
| Elongation % | 15 | 5 | 5 | 10 | 40 | 45 | 40 | 35 | 40 |
| Set % | 0 | 0 | 0 | 0 | 5 | 5 | 5 | 5 | 5 |

Example 6

Table 11 below provides an number of exemplary formulations for producing halogen-free, flame retardant filled polymer composites. The polymer components listed are typically melt processed in an initial operation, e.g., via extrusion, to provide a Polymer Blend. The Polymer Blend may then be combined in the amounts shown with the listed inorganic components in a second melt processing step, e.g., via extrusion, to provide a flame retardant polymer composite. It may be desirable to include small amounts of various additives, such as processing aid(s), antioxidant(s), UV protectant(s) and silanizing reagents (e.g., VTMOS), either in the initial mixture or added into the Polymer Blend in the second melt processing operation. Table 12 lists various properties of polymer composite formed from the formulations listed in Table 11.

TABLE 11

Illustrative Compositions

| Component (Parts by Wt) | Ex-6A | Ex-6B | Ex-6C | Ex-6D |
|---|---|---|---|---|
| Ethylene/α-octene | 60 | 60 | 60 | 60 |
| LLDPE | 40 | 40 | 40 | 40 |
| Total Polymer* | 101.4 | 101.4 | 101.4 | 101.4 |
| Other Additives** | 3.6 | 3.6 | 3.6 | 3.6 |
| MDH | 120 | 120 | 120 | 120 |
| $Sb_2O_3$ | 75 | 75 | 75 | 90 |
| Total Inorganic | 195 | 195 | 195 | 210 |

*includes adduct with silanizing reagent (VTMOS)
**mix of processing aid(s), antioxidant(s), UV protectant

TABLE 12

|  | Ex-6A | Ex-6B | Ex-6C | Ex-6D |
|---|---|---|---|---|
| MFI 21.6 kg @ 150° C. | 4.6 | 4 | 3 | 1.4 |
| Density | 1.60 | 1.62 | 1.63 | 1.69 |
| Cured Tape 0.6 mm | | | | |
| Tensile Strength MPa | 14.8 | 16.0 | 17.8 | 16.8 |
| Elongation % | 235 | 223 | 204 | 209 |
| Hot Set 20N @200° C. | Broke | Broke | Broke | |
| Elongation % | N/A | N/A | N/A | 35 |
| Set % | | | | 0 |
| Cured Wire 14 AWG | | | | |
| Tensile Strength psi | | | | 1572 |
| Elongation % | | | | 159% |
| Extrusion Quality tape | 10 | 10 | 10 | |
| VW-1 test | | | | 11P4F |

Example 7

Table 13 below provides an number of exemplary formulations for producing halogen-free, flame retardant filled polymer composites. The polymer components listed are typically melt processed in an initial operation, e.g., via extrusion, to provide a Polymer Blend. The Polymer Blend may then be combined in the amounts shown with the listed inorganic components in a second melt processing step, e.g., via extrusion, to provide a flame retardant polymer composite. It may be desirable to include small amounts of various additives, such as processing aid(s), antioxidant(s), UV protectant(s) and silanizing reagents (e.g., VTMOS), either in the initial mixture or added into the Polymer Blend in the second melt processing operation. Table 14 lists various properties of polymer composite formed from the formulations listed in Table 13.

TABLE 13

Illustrative Compositions

| Component (Parts by Wt) | Ex-7A | Ex-7B | Ex-7C | Ex-7D | Ex-7E | Ex-7F |
|---|---|---|---|---|---|---|
| Ethylene/α-octene | 60 | 60 | 60 | 60 | 60 | 60 |
| LLDPE | 40 | 40 | 30 | 40 | 40 | 40 |
| Total Polymer* | 101.4 | 101.4 | 101.4 | 101.4 | 101.4 | 101.4 |
| Polymer MFI (dg/min) @ 2.16 kg - 190° C. | 3.4 | 3.8 | 4 | 3.4 | 3.4 | 3.8 |
| Other Additives** | 3.6 | 3.6 | 3.6 | 3.6 | 3.6 | 3.6 |
| MDH | 120 | 120 | 120 | 120 | 100 | 100 |
| $Sb_2O_3$ | 75 | 75 | 75 | 75 | 75 | 75 |
| Talc | — | — | — | — | 20 | 20 |
| Total Inorganic | 195 | 195 | 195 | 195 | 195 | 195 |

*includes adduct with silanizing reagent (VTMOS)
**mix of processing aid(s), antioxidant(s), UV protectant

TABLE 14

| | Ex-6A | Ex-6B | Ex-6C | Ex-6D | Ex-6E | Ex-6F |
|---|---|---|---|---|---|---|
| MFI 21.6 kg 150° C. | 5.8 | 4.2 | 6.4 | 4.3 | 7 | 12 |
| Density | 1.60 | 1.63 | 1.63 | 1.64 | 1.65 | 1.62 |
| Cured Tape 0.6 mm | | | | | | |
| Tensile Strength MPa | 15.2 | 15.1 | 15.3 | 15.6 | 16.0 | 14.2 |
| Elongation % | 218 | 231 | 208 | 253 | 279 | 184 |
| Hot Set 20N @200° C. | Broke | Broke | Broke | Broke | Broke | |
| Elongation % | 30 secs | 30 secs | 30 secs | 30 secs | 30 secs | 45% |
| Set % | N/A | N/A | N/A | N/A | N/A | 5% |
| Deformation* (%) | 73 | — | — | 69 | 77 | — |
| VW-1 test | 2P1F | — | — | 1P2F | 3F | — |
| Extrusion Quality tape | 10 | 10 | 10 | 10 | 10 | 10 |

*Deformation (%) at 131° C., 500 g pursuant to UL 44 Clause 5.12

Example 8

Table 15 below provides a number of exemplary formulations for producing halogen-free, flame retardant filled polymer composites. The polymer components listed are typically melt processed in an initial operation, e.g., via extrusion, to provide a Polymer Blend. The Polymer Blend may then be combined in the amounts shown with the listed inorganic components in a second melt processing step, e.g., via extrusion, to provide a flame retardant polymer composite. It may be desirable to include small amounts of various additives, such as processing aid(s), antioxidant(s), UV protectant(s) and silanizing reagents (e.g., VTMOS), either in the initial mixture or added into the Polymer Blend in the second melt processing operation. Tables 16 and 17 list various properties of polymer composite formed from the formulations listed in Table 15.

TABLE 15

| Component (Wt. %) | 7-Comp1 | Ex-7A | Ex-7B | Ex-7C | Ex-7D | Ex-7E |
|---|---|---|---|---|---|---|
| Ethylene/α-octene | 50 | 50 | 40 | 40 | 40 | 40 |
| Ethylene/vinyl acetate | — | — | 20 | 20 | 20 | 20 |
| Polyethylene | 50 | 50 | 40 | 40 | 40 | 40 |
| Total Polymer** | 101.5 | 106.5 | 106.5 | 106.5 | 101.5 | 106.5 |
| Other additives*** | 7.0 | 7.0 | 7.5 | 7.5 | 7.0 | 7.0 |
| MDH | 132 | 99 | 99 | 99 | 99 | 99 |
| $Sb_2O_3$ | — | 45* | 45* | 45* | 40 | 45* |
| Total Inorganic | 132 | 144 | 144 | 144 | 139 | 144 |

*as 90 wt. % dispersion in polymer
**includes adduct with silanizing reagent (VTMOS)
***mix of processing aid(s), antioxidant(s), UV protectant

| Component (Wt. %) | Ex-7F | Ex-7G | Ex-7H | Ex-7I | Ex-7J |
|---|---|---|---|---|---|
| Ethylene/α-octene | 40 | 40 | 50 | 40 | 50 |
| Ethylene/vinyl acetate | 20 | 20 | — | 20 | 10 |
| Polyethylene | 40 | 40 | 50 | 40 | 40 |
| Total Polymer** | 106.5 | 106.5 | 106.5 | 101.5 | 101.5 |
| Other additives*** | 7.5 | 7.5 | 7.0 | 7.0 | 6.0 |
| MDH | 99 | 99 | 99 | 99.5 | 99.5 |
| $Sb_2O_3$ | 45* | 45* | 45* | 50 | 50 |
| Total Inorganic | 144 | 144 | 144 | 149.5 | 149.5 |

*as 90 wt. % dispersion in polymer
**includes adduct with silanizing reagent (VTMOS)
***mix of processing aid(s), antioxidant(s), UV protectant

| Component (Wt. %) | 7-Comp2 | Ex-7K | Ex-7L | Ex-7M |
|---|---|---|---|---|
| Ethylene/α-octene | 50 | 50 | 40 | 40 |
| Ethylene/vinyl acetate | — | 10 | 20 | 20 |
| Polyethylene | 50 | 40 | 40 | 40 |
| Total Polymer** | 101.2 | 101.5 | 101.5 | 101.5 |
| Other additives*** | 1.7 | 6.0 | 5.0 | 7.0 |
| MDH | 100 | 99.5 | 99.5 | 99.5 |
| Sb2O3 | — | 50 | 23 | 23 |
| Total Inorganic | 100 | 149.5 | 122.5 | 122.5 |

**includes adduct with silanizing reagent (VTMOS)
***mix of processing aid(s), antioxidant(s), UV protectant

TABLE 16

| Sample # | MFI | LOI | LTB | Elong. | TSB | Extr. Q* |
|---|---|---|---|---|---|---|
| 7-Comp1 | 7.3 | — | — | 281% | 12.5 | 10 |
| Ex-7A | 6.2 | — | — | 348% | 13.1 | 10 |
| Ex-7B | 21.0 | — | — | 296% | 9.6 | — |
| Ex-7C | 1.5 | — | — | 220% | 10.8 | — |
| Ex-7E | 9.8 | — | — | 288% | 10.8 | — |
| Ex-7F | 2.4 | — | — | 270% | 10.1 | 9 |
| Ex-7G | 7.4 | — | — | 383% | 10.7 | 10 |
| Ex-7H | 9.0 | — | — | 491% | 13.1 | 10 |
| Ex-7I | 2.4* | — | — | 190% | 10.3 | 10 |
| Ex-7J | 0.7* | 32 | −29 | 162% | 12.3 | 9 |
| Ex-7K | 0.1* | 33 | −32 | 204% | 11.5 | 9 |
| Ex-7L | 1.6* | 30 | −27 | 277% | 10.8 | 9 |
| Ex-7M | 1.4* | — | — | 182% | 10.8 | — |
| 7-Comp2 | 5* | 40 | −42 | 324% | 14.6 | 10 |
| Target | | | ≤−25 | ≥220% | ≥10.3 MPa | |

Extr. Q*—Extrusion Quality (1-10 scale); MFI 21.6 kg @ 150° C. {with * - MFI 21.6 kg @ 190° C.}
LOI % (ASTM D 2863)
LTB; 3 min in methanol, ASTM D 790
TSB—4 or 8 hours cured Tensile Strength @ break MPa (tape)
Elong.—4 or 8 hours cured Elongation @ Break % (tape)

TABLE 17

| | Properties Retained After Thermal Ageing | | | | | |
|---|---|---|---|---|---|---|
| Sample # | 121 Air TSB | 121 Air Elong. | 100 Oil TSB | 100 Oil Elong. | 75 Oil TSB | 75 Oil Elong. |
| 7-Comp1 | — | — | 66% | 85% | — | — |
| Ex-7A | Pass* | Pass | 61% | 64% | Pass | Pass |
| Ex-7B | Pass | Pass | 51% | 63% | Pass | Pass |
| Ex-7C | Pass | Pass | 64% | 81% | Pass | Pass |
| Ex-7E | — | — | — | — | — | — |
| Ex-7F | — | — | 58% | 62% | — | — |
| Ex-7G | — | — | — | — | — | — |
| Target | >70% | >70% | >50% | >50% | >65% | >65% |
| Ex-7I | — | — | 68% | 98% | — | — |
| Ex-7L | — | — | 59% | 51% | — | — |
| Ex-7M | — | — | 67% | 106% | — | — |
| 7-Comp2 | 116% | 94% | 58% | 70% | — | — |
| Target | >70% | >70% | >50% | >50% | >65% | >65% |

Pass*—Exceeds target retention %
121 Air—After thermal air ageing 168 hrs at 121° C.
100 Oil—After accelerated aging in mineral oil 96 hours at 100° C. in IRM 902
75 Oil—After accelerated aging in mineral oil 60 days at 75° C. in IRM 902

ILLUSTRATIVE EMBODIMENTS

While certain embodiments have been illustrated and described, it should be understood that changes and modifications can be made therein in accordance with ordinary skill in the art without departing from the technology in its broader aspects.

In one aspect, the present composition may be a halogen free polymer composite, which includes (A) 100 parts by weight polymer material, which includes about 30 to 75 wt % ethylene/α-olefin copolymer, and about 25 to 60 wt % polyolefin; (B) about 50 to 175 parts by weight hydrated metal oxide flame-retardant; and (C) about 30 to 100 parts by weight antimony compound. Quite commonly, the total amount of the hydrated metal oxide and antimony compound makes up about 50-70 wt % of the polymer composite. The hydrated metal oxide flame-retardant may include a magnesium, calcium, zinc and/or aluminum hydroxide. Typically, the hydrated metal oxide flame-retardant includes a hydrated magnesium oxide, such as a precipitated magnesium dihydroxide (MDH). The hydrated metal oxide flame-retardant may include particulate magnesium hydroxide treated with a vinyl silane coating. The antimony compound may include antimony trioxide, antimony pentoxide, antimony tetroxide, sodium antimonate, and/or antimony tartrate. Commonly, the antimony compound includes antimony trioxide. The polyolefin typically includes polyethylene, such as a linear low density polyethylene (LLDPE). The ethylene/α-olefin copolymer may include an ethylene/α-olefin plastomer, such as an ethylene/α-octene plastomer. In some embodiments, the polymer material may include an olefin block copolymer, such as an ethylene/α-olefin-polyethylene block copolymer. One suitable example is an ethylene/α-octene-HDPE block copolymer. In some embodiments, the ethylene/α-olefin copolymer includes both an ethylene/α-olefin plastomer and an ethylene/α-olefin-polyethylene block copolymer.

In one aspect, the present composition may be a halogen free polymer composite, which includes (A) 100 parts by weight polymer material, which includes about 50 to 75 wt % ethylene/α-olefin copolymer, and about 25 to 50 wt % polyolefin; (B) about 50 to 175 parts by weight hydrated metal oxide flame-retardant; and (C) about 60 to 100 parts by weight antimony compound. Quite commonly, the total amount of the hydrated metal oxide and antimony compound makes up about 55-70 wt % of the polymer composite. In many embodiments, the polymer material comprises about 50 to 70 wt % ethylene/α-olefin plastomer and about 30 to 50 wt % polyethylene. For example, the polymer material in the present polymer composite may include about 50 to 70 wt % ethylene/α-octene plastomer and about 30 to 50 wt % linear low density polyethylene. In other embodiments, the polymer material includes about 25 to 35 wt % ethylene/α-olefin plastomer; about 25 to 35 wt % polyolefin block copolymer; and about 30 to 50 wt % polyethylene. For example, the polymer material in the present polymer composite may include about 25 to 35 wt % ethylene/α-octene plastomer; about 25 to 35 wt % ethylene/α-olefin-polyethylene block copolymer; and about 30 to 50 wt % linear low density polyethylene.

In some embodiments, the present polymer composite includes about 175 to 225 parts by weight inorganic materials per 100 parts by weight of the polymer material. In some instances, the polymer composite includes about 75 to 125 parts by weight magnesium hydroxide and about 60 to 95 parts by weight antimony trioxide per 100 parts by weight of the polymer material. The composite may also include about 5 to 40 parts by weight talc, zinc borate and/or ammonium polyphosphate per 100 parts by weight of the polymer material.

In some embodiments, the present polymer composite includes (A) 100 parts by weight of the polymer material, which includes about 50 to 70 wt % ethylene/α-octene plastomer; and about 30 to 50 wt % linear low density polyethylene; (B) about 75 to 125 parts by weight magnesium hydroxide; and (C) about 50 to 100 parts by weight antimony trioxide. The composite may also include one or more additives such as talc, zinc borate, clay and ammonium polyphosphate. In some embodiments, the polymer composite includes (A) 100 parts by weight of the polymer material, which includes about 50 to 70 wt % ethylene/α-octene plastomer; and about 30 to 50 wt % linear low density polyethylene; (B) about 75 to 125 parts by weight magnesium hydroxide; and (C) about 60 to 100 parts by weight antimony trioxide.

In some embodiments, the present polymer composite includes (A) 100 parts by weight of the polymer material, which includes about 20 to 40 wt % ethylene/α-olefin plastomer; about 20 to 40 wt % ethylene/α-olefin-polyethylene block copolymer; and about 30 to 50 wt % polyethylene; (B) about 50 to 150 parts by weight magnesium hydroxide; and (C) about 50 to 100 parts by weight antimony trioxide. For example, the polymer composite may include about 20 to 40 wt % ethylene/α-octene plastomer; about 20 to 40 wt % ethylene/α-olefin-polyethylene block copolymer; and about 30 to 50 wt % linear low density polyethylene; (B) about 75 to 150 parts by weight magnesium hydroxide; and (C) about 60 to 100 parts by weight antimony trioxide. In some such embodiments, the polymer material in the composite includes about 25 to 35 wt % ethylene/α-octene plastomer; about 25 to 35 wt % ethylene/α-olefin-polyethylene block copolymer; and about 30 to 50 wt % linear low density polyethylene.

In any of the embodiments described herein, the ethylene/α-olefin copolymer may include an ethylene/α-octene plastomer having a melt flow rate @ 190° C. & 2.16 kg of about 1 to 35 g/10 min (as determined pursuant to ISO 1183), a melting temperature of about 70 to 110° C. (as determined pursuant to ISO 11357-3) and a density of about 880 to 915 kg/m$^3$ at 23° C. (as determined pursuant to ISO 1183). In some embodiments, the ethylene/α-olefin copolymer includes an ethylene/α-octene plastomer having a melt flow rate @ 190° C. & 2.16 kg of about 1 to 35 g/10 min (as determined pursuant to ISO 1183), a melting temperature of about 70 to 80° C. (as determined pursuant to ISO 11357-3) and a density of about 880 to 890 kg/m$^3$ at 23° C. (as determined pursuant to ISO 1183).

In any of the embodiments described herein, the hydrated metal oxide flame-retardant may include magnesium hydroxide treated with a vinyl silane coating. It may advantageous to utilize a hydrated metal oxide flame-retardant, which includes precipitated magnesium hydroxide having a Specific Surface Area (BET) of 8.0-11.0 m$^2$/g and a particle size $d_{50}$ of about 0.8-1.1 μm (as measured by laser diffraction).

In some embodiments, the present halogen free polymer composite includes about 10 to 25 wt % ethylene/α-olefin copolymer; about 10 to 15 wt % polyolefin; about 20 to 50 wt % hydrated metal oxide flame-retardant; and about 20 to 35 wt % antimony compound. For example, the polymer composite may include about 10 to 25 wt % ethylene/α-octene copolymer; about 10 to 15 wt % polyethylene; about 20 to 50 wt % hydrated magnesium oxide; and about 20 to 35 wt % antimony compound. In many instances, the polyolefin includes polyethylene, such as a linear low density polyethylene, and the antimony compound comprises antimony trioxide.

In some embodiments, the present halogen free polymer composite includes about 5 to 15 wt % ethylene/α-olefin plastomer; about 5 to 15 wt % ethylene/α-olefin-polyethylene block copolymer; about 10 to 15 wt % polyethylene;

about 20 to 50 wt % hydrated metal oxide flame-retardant; and about 20 to 35 wt % antimony compound.

In some embodiments, the present halogen free polymer composite includes about 5 to 15 wt % ethylene/α-octene plastomer; about 5 to 15 wt % ethylene/α-octene-polyethylene block copolymer; about 10 to 15 wt % linear low density polyethylene; about 20 to 50 wt % hydrated magnesium oxide; and about 20 to 35 wt % antimony trioxide.

In some embodiments, the present halogen free polymer composite includes about 10 to 25 wt % ethylene/α-olefin plastomer having a melt flow rate of about 1-40 g/10 min (2.16 kg @ 190° C.), a melting point of about 70-80° C.; about 10 to 15 wt % linear low density polyethylene having a melt flow rate (as determined pursuant to ASTM D 1238) of about 1-5 g/10 min (2.16 kg @ 190° C.), a Vicat softening point of about 90-110° C. (as determined pursuant to ASTM D 1525); about 20 to 50 wt % precipitated magnesium dihydroxide (MDH) having an average particle size of no more than about 2 microns; and about 20 to 35 wt % antimony trioxide.

In some embodiments of the present halogen free polymer composite described above, it may be desirable to include an additive that facilitates crosslinking of the polymer material in the composite. For example, where the composite is designed to be crosslinked via moisture curing, the polymer material commonly includes a silane-grafted polymer, such as a silane-grafted ethylene/α-olefin copolymer (e.g., silane-grafted ethylene/α-octene plastomer), a silane-grafted thermoplastic polyethylene (e.g., silane-grafted LLDPE) and/or a silane-grafted olefin block copolymer, e.g., silane-grafted ethylene/α-olefin-polyethylene block copolymer. Where the composite is designed to be crosslinked via radiation curing (e.g., electron beam methods), the polymer material may include a radiation curing co-agent, which includes two or more unsaturated carbon-carbon functional groups. Suitable examples of a radiation curing co-agent include triallyl cyanurate (TAC) and/or trimethylolpropane trimethacrylate (TMPTA). Where the composite is designed to be crosslinked via free radical curing methods, the polymer material may include a free radical curing co-agent, which includes a polymer having olefinic functional groups. Suitable examples of a free radical curing co-agent include olefinic functional polymers, such as styrene/butadiene copolymers and styrene/isoprene copolymers.

In another aspect, the present composite may be a halogen free polymer composite, which includes about 10 to 25 wt % ethylene/α-olefin copolymer; about 10 to 15 wt % polyolefin; about 20 to 50 wt % hydrated metal oxide flame-retardant; and about 20 to 35 wt % antimony compound. The hydrated metal oxide flame-retardant commonly includes magnesium hydroxide, e.g., a precipitated magnesium dihydroxide (MDH). The antimony compound typically includes antimony trioxide, antimony pentoxide, antimony tetroxide, sodium antimonate, and/or antimony tartrate. In some embodiments, the sheathing material includes a combination of magnesium hydroxide and antimony trioxide.

In another aspect, the present composite may be a halogen free polymer composite, which includes about 10 to 25 wt % ethylene/α-octene copolymer; about 10 to 15 wt % polyethylene, such as LLDPE; about 20 to 50 wt % hydrated metal oxide flame-retardant; and about 20 to 35 wt % antimony compound. The hydrated metal oxide flame-retardant commonly includes magnesium hydroxide, e.g., a precipitated magnesium dihydroxide (MDH). The antimony compound typically includes antimony trioxide, antimony pentoxide, antimony tetroxide, sodium antimonate, and/or antimony tartrate. In some embodiments, the sheathing material includes a combination of magnesium hydroxide and antimony trioxide.

In some embodiments, the composite may include a co-agent additive(s) to promote radiation curing, such as a co-agent additive containing three or more unsaturated carbon-carbon functional groups. The radiation-curable co-agent may include triallyl cyanurate (TAC), trimethylolpropane trimethacrylate (TMPTA), trimethylolpropane triacrylate, and/or triallyl trimethylolpropane.

In some embodiments, the composition may include a co-agent additive(s) to promote free radical curing, such as a co-agent additive which is an unsaturated polymer, e.g., a styrene/butadiene copolymer.

In another aspect, the present composition may be a crosslinkable, halogen-free polymer composite, which includes 100 parts by weight of a silane-grafted polymer blend, which is formed by silane-grafting a mixture which comprises a ethylene/α-olefin copolymer and polyolefin, such as linear low density polyethylene, about 60 to 100 parts by weight antimony compound, and about 50 to 175 parts by weight of a hydrated metal oxide flame-retardant, such as magnesium hydroxide.

Insulation materials formed from curing the present flame retardant polymer composite materials described herein commonly meet one or more of the following specifications:
 the composition passes the Underwriter's Laboratory ("UL") VW-1 flame test (as determined pursuant to UL 44 Clause 5.14.4 in accordance with UL 2556, Clause 9.4;
 the composition maintains long term insulation resistance after being exposed to water at 90° C. for at least 24 weeks (as determined pursuant to UL 44 Clause 5.4);
 the composition has a tensile strength before aging of at least about 10 MPa (1500 lbf/in$^2$) (as determined pursuant to UL 44 Clause 4.2 & UL 44, Table 11);
 the composition has an elongation before aging of at least about 150% (as determined pursuant to UL 44 Clause 4.2 & UL 44, Table 11);
 the composition has a decrease in tensile strength after air oven accelerated aging for 7 days at 121° C. of no more than about 30% (as determined pursuant to UL 44 Clause 4.2 & UL 44, Table 11);
 the composition has a decrease in elongation after air oven accelerated aging for 7 days at 121° C. of no more than about 30% (as determined pursuant to UL 44 Clause 4.2 & UL 44, Table 11);
 the composition exhibits no cracks or ruptures after being subjected to a cold bend test at −25° C. for 4 hours (as determined pursuant to UL 44 Clause 5.11);
 the composition exhibits no cracks or ruptures after being subjected to a cold impact test at −40° C. (as determined pursuant to UL 44 Clause 5.11);
 the composition exhibits a deformation of less than about 30% (14-4/0 AWG) (as determined pursuant to UL 44 Clause 5.12);
 the composition has a decrease in tensile strength after accelerated aging in mineral oil (IRM 902) for 4 days at 100° C. of no more than 50% (as determined pursuant to UL 44 Clause 5.16.1);
 the composition has a decrease in elongation after accelerated aging in mineral oil (IRM 902) for 4 days at 100° C. of no more than 50% (as determined pursuant to UL 44 Clause 5.16.1);
 the composition has a decrease in tensile strength after accelerated aging in mineral oil (IRM 902) for 60 days at 75° C. of no more than 65% (as determined pursuant to UL 44 Clause 5.16.1); and the composition has a decrease in elongation after accelerated aging in mineral oil (IRM 902) for 60 days at 75° C. of no more than 65% (as determined pursuant to UL 44 Clause 5.16.1).

In some embodiments, the polymer composite includes (A) 100 parts by weight polymer material, which includes about 30 to 60 wt % ethylene/α-olefin copolymer, such as an ethylene/α-octene plastomer; and about 30 to 60 wt % polyethylene, such as a linear low density polyethylene; (B) about 50 to 150 parts by weight hydrated metal oxide flame-retardant, such as magnesium dihydroxide; and (C) about 30 to 75 parts by weight antimony compound, e.g., antimony trioxide. Such polymer composites may desirably be halogen-free. In some instances, the polymer material may also include an olefin/unsaturated ester copolymer, such as an ethylene/vinyl acetate copolymer and/or an ethylene/alkyl (meth)acrylate copolymer. When the olefin/unsaturated ester copolymer is present, it may commonly constitute up to about 30 wt % of the polymer material.

A cured form of the flame retardant polymer compositions described in the paragraph immediately above may meet one or more of the following specifications:

a sheathing material formed from the composition has a tensile strength at break before aging of at least about 1500 lbf/in$^2$ (10.3 MPa) (as determined pursuant to UL 1277 (April, 2010));

a sheathing material formed from the composition has an elongation at break before aging of at least about 150% (as determined pursuant to UL 1277 (April, 2010));

a cable consisting of 9 copper insulated 12 AWG conductors sheathed with a material formed from the composition passes the Underwriter's Laboratory Vertical-tray test "Method 2" described in UL 2556 (March 2013);

a sheathing material formed from the composition has a decrease in tensile strength at break after air oven accelerated aging for 168 hours at 121° C. of no more than about 30% (as determined pursuant to UL 1277 (April, 2010));

a sheathing material formed from the composition has a decrease in elongation at break after air oven accelerated aging for 168 hours at 121° C. of no more than about 30% (as determined pursuant to UL 1277 (April, 2010));

a sheathing material formed from the composition exhibits a tensile strength at break after accelerated aging for 96 hours at 100° C. in mineral oil (IRM 902) which is at least about 50% of its unaged tensile strength at break (as determined pursuant to UL 1277 (April, 2010));

a sheathing material formed from the composition exhibits a elongation at break after accelerated aging for 96 hours at 100° C. in mineral oil (IRM 902) which is at least about 50% of its unaged elongation at break (as determined pursuant to UL 1277 (April, 2010));

a sheathing material formed from the composition exhibits a tensile strength at break after accelerated aging for 60 days at 75° C. in mineral oil (IRM 902) which is at least about 65% of its unaged tensile strength at break (as determined pursuant to UL 1277 (April, 2010));

a sheathing material formed from the composition exhibits a elongation at break after accelerated aging for 60 days at 75° C. in mineral oil (IRM 902) which is at least about 65% of its unaged elongation at break (as determined pursuant to UL 1277 (April, 2010));

a sheathing material formed from the composition exhibits a deformation of less than about 15% (XL jacket; 121° C., 19.61 N load) (as determined pursuant to UL 1277 (April, 2010));

a cable sheathed with a material formed from the composition exhibits no cracks or ruptures after being subjected to a cold bend test at −25° C. (as determined pursuant to UL 1277 (April 2010); and a cable sheathed with a material formed from the composition exhibits no cracks or ruptures after being subjected to a cold impact test at −40° C. (as determined pursuant to UL 1277 (April 2010).

In some embodiments, the polymer composite includes (A) 100 parts by weight polymer material, which includes about 40 to 60 wt % ethylene/α-olefin copolymer, such as an ethylene/α-octene plastomer; and about 40 to 60 wt % polyethylene, such as a linear low density polyethylene; (B) about 50 to 150 parts by weight hydrated metal oxide flame-retardant, such as magnesium dihydroxide; and (C) about 30 to 75 parts by weight antimony compound, e.g., antimony trioxide.

In some embodiments, the polymer composite includes (A) 100 parts by weight polymer material, which includes about 30 to 50 wt % ethylene/α-olefin copolymer, such as an ethylene/α-octene plastomer; about 30 to 50 wt % polyethylene, such as a linear low density polyethylene; and up to about 30 wt % of an olefin/unsaturated ester copolymer; (B) about 50 to 150 parts by weight hydrated metal oxide flame-retardant, such as magnesium dihydroxide; and (C) about 30 to 75 parts by weight antimony compound, e.g., antimony trioxide. The olefin/unsaturated ester copolymer may include an ethylene/vinyl acetate copolymer and/or an ethylene/alkyl (meth)acrylate copolymer, such as an ethylene/butyl acrylate copolymer.

In one aspect, the present composition may be a halogen free polymer composite, which includes (A) 100 parts by weight polymer material, which includes about 30 to 60 wt % ethylene/α-olefin copolymer, and about 30 to 60 wt % polyolefin; (B) about 50 to 150 parts by weight hydrated metal oxide flame-retardant; and (C) about 30 to 76 parts by weight of an antimony compound. The composite typically includes at least about 125 parts by weight total of the hydrated metal oxide flame-retardant and the antimony compound per 100 parts by weight of the polymer material. Quite commonly, the total amount of the hydrated metal oxide and antimony compound makes up about 50-70 wt % of the polymer composite. The hydrated metal oxide flame-retardant may include a magnesium, calcium, zinc and/or aluminum hydroxide. Typically, the hydrated metal oxide flame-retardant includes a hydrated magnesium oxide, such as a precipitated magnesium dihydroxide (MDH). In some instances the polymer material may also include an olefin/unsaturated ester copolymer, e.g., up to about 30 wt % ethylene/vinyl acetate copolymer and/or an ethylene/alkyl (meth)acrylate copolymer, such as an ethylene/butyl acrylate copolymer. In some embodiments, the polymer material includes about 40 to 60 wt % of an ethylene/α-octene plastomer and about 40 to 60 wt % of linear low density polyethylene (LLDPE). In other embodiments, the polymer material includes about 30 to 50 wt % ethylene/α-octene plastomer; about 30 to 50 wt % linear low density polyethylene; and about 5 to 25 wt % ethylene/vinyl acetate copolymer. The ethylene/vinyl acetate copolymer may desirably have a vinyl acetate content of about 15 to 30%. Typically, the antimony compound includes antimony trioxide, antimony pentoxide, antimony tetroxide, sodium antimonate, and/or antimony tartrate, preferably antimony trioxide. The hydrated metal oxide flame-retardant commonly includes a magnesium, calcium, zinc and/or aluminum hydroxide. For example, the hydrated metal oxide flame-retardant may include magnesium dihydroxide, aluminum monohydroxide and/or aluminum trihydroxide. Quite commonly, the polymer composite may include a combination of magnesium dihydroxide and antimony trioxide.

In another aspect, the present composition may be a halogen free polymer composite, which includes (A) 100 parts by weight polymer material, which includes about 40 to 60 wt % ethylene/α-octene plastomer; and about 40 to 60 wt % linear low density polyethylene; (B) about 75 to 125 parts by weight magnesium dihydroxide; and (C) about 35 to 50 parts by weight antimony trioxide.

In another aspect, the present composition may be a halogen free polymer composite, which includes (A) 100 parts by weight of the polymer material, which includes about 30 to 50 wt % ethylene/α-octene plastomer; about 30 to 50 wt % linear low density polyethylene; and about 5 to 25 wt % ethylene/vinyl acetate copolymer; (B) about 75 to 125 parts by weight magnesium dihydroxide; and (C) about 35 to 50 parts by weight antimony trioxide.

In another aspect, a cable sheathing material may be formed by crosslinking the polymer composites described herein. For example, when the composite includes a radiation curing co-agent, such as a compound which includes two or more unsaturated carbon-carbon functional groups, the composite can be crosslinked by exposure to electron beam irradiation. When the composite includes a free radical initiator and a free radical curing co-agent, such as a polymer, which includes olefinic functional groups, the composite can be crosslinked by heating to a temperature sufficient to decompose the free radical initiator. When the composite includes a silane-grafted polymer, the composition composite can be crosslinked by exposure to moisture under appropriate conditions.

In those embodiments where it may be desired to crosslink the polymer component of the composite via a radiation curing method, a radiation curing co-agent, which includes two or more unsaturated carbon-carbon functional groups, may be included in the polymer material. Suitable examples of radiation curing co-agents include triallyl cyanurate (TAC) and trimethylolpropane trimethacrylate (TMPTA).

In those embodiments where it may be desired to crosslink the polymer component of the composite via a free radical curing method, a free radical curing co-agent, which includes a polymer having olefinic functional groups, may be included in the polymer material. Suitable examples of free radical curing co-agents include polymers containing unsaturated functionality, such as a styrene/butadiene copolymer.

In those embodiments where it may be desired to crosslink the polymer component of the composite via a moisture curing method, a silane-grafted polymer may be included in the polymer material. This may be accomplished by grafting silane functional groups onto one or more of the polymeric materials in the composite. For example, a crosslinkable thermoplastic polymer blend may be formed by grafting a polymer blend with silane functional groups, e.g., through free radical initiated reaction with a vinyl alkoxysilane, such as a vinyltrialkoxysilane (e.g., VTMOS or VTEOS).

The embodiments, illustratively described herein may suitably be practiced in the absence of any element or elements, limitation or limitations, not specifically disclosed herein. Thus, for example, the terms "comprising," "including," "containing," shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof.

What is claimed is:

1. A halogen-free polymer composite comprising:
   (A) 100 parts by weight polymer material, which comprises
      about 30 to 75 wt % ethylene/α-olefin copolymer; and
      about 25 to 60 wt % polyolefin;
   (B) about 50 to 175 parts by weight hydrated metal oxide flame-retardant; and
   (C) about 30 to 100 parts by weight antimony compound.

2. The composite of claim 1, wherein the hydrated metal oxide flame-retardant comprises magnesium hydroxide; and the antimony compound comprises antimony trioxide, antimony pentoxide, antimony tetroxide, sodium antimonate, and/or antimony tartrate.

3. The composite of claim 2, wherein the total of the hydrated metal oxide and antimony compound is about 50-70 wt % of the composition; and the polymer material comprises silane-grafted ethylene/α-olefin copolymer and/or silane-grafted polyethylene.

4. The composite of claim 3, wherein the polyolefin comprises linear low density polyethylene; and the ethylene/α-olefin copolymer comprises ethylene/α-octene plastomer.

5. The composite of claim 3, wherein the polyolefin comprises polyethylene; and the ethylene/α-olefin copolymer comprises ethylene/α-olefin plastomer and ethylene/α-olefin-polyethylene block copolymer.

6. The composite of claim 3, comprising:
   (A) 100 parts by weight of the polymer material, which comprises
      about 50 to 70 wt % ethylene/α-octene plastomer; and
      about 30 to 50 wt % linear low density polyethylene;
   (B) about 70 to 150 parts by weight magnesium hydroxide; and
   (C) about 60 to 100 parts by weight antimony trioxide.

7. The composite of claim 3, comprising:
   (A) 100 parts by weight of the polymer material, which comprises
      about 20 to 40 wt % ethylene/α-octene plastomer;
      about 20 to 40 wt % ethylene/α-olefin-polyethylene block copolymer; and about 30 to 50 wt % linear low density polyethylene;
(B) about 70 to 150 parts by weight magnesium hydroxide; and
(C) about 60 to 100 parts by weight antimony trioxide.

8. The composite of claim 3, wherein a sheathing material formed from the composite has a tensile strength before aging of at least about 10 MPa (1500 lbf/in$^2$) (as determined pursuant to UL 44 Clause 4.2 & UL 44, Table 11).

9. The composite of claim 3, wherein a sheathing material formed from the composite has an elongation before aging of at least about 150% (as determined pursuant to UL 44 Clause 4.2 & UL 44, Table 11).

10. The composite of claim 3, wherein a sheathing material formed from the composite maintains long term insulation resistance after being exposed to water at 90° C. for at least 24 weeks (as determined pursuant to UL 44 Clause 5.4).

11. The composite of claim 3, wherein a sheathing material formed from the composite passes the Underwriter's Laboratory ("UL") VW-1 flame test (as determined pursuant to UL 44 Clause 5.14.4 in accordance with UL 2556, Clause 9.4).

12. The composite of claim 3, wherein a sheathing material formed from the composite exhibits an elongation at break of at least about 150%; and passes the Long Term Insulation Resistance ("LTIR") requirements at 90° C. in accordance with UL 44 Clause 5.4 and the VW-1 flame test (as determined pursuant to UL 44 Clause 5.14.4 in accordance with UL 2556, Clause 9.4).

13. The composite of claim 3, wherein a sheathing material formed from the composite has an elongation before aging of at least about 150% (as determined pursuant to UL 44 Clause 4.2 & UL 44, Table 11); a tensile strength before aging of at least about 10 MPa (1500 lbf/in$^2$) (as determined pursuant to UL 44 Clause 4.2 & UL 44, Table 11); and maintains long term insulation resistance after being exposed to water at 90° C. for 24 weeks (as determined pursuant to UL 44 Clause 5.4).

14. The composite of claim 3, wherein a sheathing material formed from the composite has a decrease in tensile strength after air oven accelerated aging for 7 days at 121° C. of no more than about 30% (as determined pursuant to UL 44 Clause 4.2, Table 11).

15. The composite of claim 3, wherein a sheathing material formed from the composite has a decrease in elongation after air oven accelerated aging for 7 days at 121° C. of no more than about 30% (as determined pursuant to UL 44 Clause 4.2 & UL 44, Table 11).

16. The composite of claim 3, wherein a sheathing material formed from the composite exhibits no cracks or ruptures after being subjected to a cold bend test at −25° C. for 4 hours (as determined pursuant to UL 44 Clause 5.11).

17. The composite of claim 3, wherein a sheathing material formed from the composite exhibits no cracks or ruptures after being subjected to a cold impact test at −40° C. (as determined pursuant to UL 44 Clause 5.11).

18. The composite of claim 3, wherein a sheathing material formed from the composite exhibits a deformation of less than about 30% (14-4/0 AWG) (as determined pursuant to UL 44 Clause 5.12).

19. The composite of claim 2, wherein the composite further comprises one or more additives selected from talc, zinc borate, clay and ammonium polyphosphate.

20. The composite of claim 3, wherein the ethylene/α-olefin copolymer comprises ethylene/α-octene plastomer and ethylene/α-olefin-HDPE block copolymer.

21. The composite of claim 3, wherein the hydrated metal oxide flame-retardant comprises magnesium hydroxide treated with a vinyl silane coating, wherein the magnesium hydroxide has a Specific Surface Area (BET) of 8.0-11.0 m$^2$/g and a particle size d$_{50}$ of 0.8-1.1 μm (as measured by laser diffraction).

22. A halogen-free polymer composite comprising:
about 10 to 25 wt % ethylene/α-olefin copolymer, which comprises ethylene/α-octene plastomer having a melt flow rate of about 1-40 g/10 min (2.16 kg @ 190° C.) and a melting point of about 70-80° C.;
about 10 to 15 wt % linear low density polyethylene having a melt flow rate (as determined pursuant to ASTM D 1238) of about 1-5 g/10 min (2.16 kg @ 190° C.), a Vicat softening point of about 90-110° C. (as determined pursuant to ASTM D 1525);
about 20 to 50 wt % precipitated magnesium dihydroxide having an average particle size of no more than about 2 microns; wherein the magnesium dihydroxide is optionally treated with a vinyl silane coating; and
about 20 to 35 wt % antimony trioxide;
wherein the composite comprises silane-grafted ethylene/α-olefin copolymer and/or silane-grafted polyethylene.

23. The composite of claim 22 comprising:
about 5 to 15 wt % of the ethylene/α-octene plastomer;
about 10 to 15 wt % of the linear low density polyethylene; and
the ethylene/α-olefin copolymer further comprises ethylene/α-olefin-polyethylene block copolymer and the composite comprises about 5 to 15 wt % (based on the total weight of the composite) of the ethylene/α-olefin-polyethylene block copolymer.

24. The composite of claim 23, wherein the ethylene/α-olefin-polyethylene block copolymer is ethylene/α-olefin-HDPE block copolymer.

25. A halogen-free polymer composite comprising:
(A) 100 parts by weight polymer material, which comprises
about 30 to 60 wt % ethylene/α-olefin copolymer;
about 30 to 60 wt % polyethylene; and
zero to about 30 wt % olefin/unsaturated ester copolymer;
wherein the polymer material comprises silane-grafted ethylene/α-olefin copolymer and/or silane-grafted polyethylene;
(B) about 50 to 150 parts by weight hydrated magnesium oxide; and
(C) about 30 to 75 parts by weight antimony compound;
wherein the total of the hydrated magnesium oxide and the antimony compound constitutes about 50-70 wt % of the composite.

26. A halogen-free polymer composite comprising:
(A) 100 parts by weight polymer material, which comprises
about 50 to 70 wt % ethylene/α-olefin copolymer; and
about 30 to 50 wt % polyethylene;
(B) about 70 to 150 parts by weight hydrated magnesium oxide flame-retardant; and
(C) about 50 to 100 parts by weight antimony compound;
wherein the composite includes about 20 to 35 wt % of the antimony compound; and the total amount of the hydrated magnesium oxide and the antimony compound is about 50-70 wt % of the composite.

27. The composite of claim 26, wherein the ethylene/α-olefin copolymer comprises ethylene/α-olefin plastomer and ethylene/α-olefin-polyethylene block copolymer.

28. The composite of claim 26, wherein the polymer material comprises silane-grafted ethylene/α-olefin copolymer and/or silane-grafted polyethylene.

29. The composite of claim 26, wherein the polymer material comprises
   about 25 to 35 wt % ethylene/α-octene plastomer,
   about 25 to 35 wt % ethylene/α-olefin-polyethylene block copolymer and
   about 30 to 50 wt % linear low density polyethylene; and
   the composite comprises
   about 75 to 125 parts by weight precipitated magnesium dihydroxide having an average particle size of no more than about 2 microns; and
   about 60 to 95 parts by weight antimony trioxide.

30. The composite of claim 25, wherein the polymer material comprises about 40 to 60 wt % ethylene/α-octene plastomer; and about 40 to 60 wt % linear low density polyethylene; and
   the composite comprises about 75 to 125 parts by weight magnesium dihydroxide; and about 35 to 50 parts by weight antimony trioxide.

31. The composite of claim 25, wherein the polymer material comprises about 30 to 50 wt % ethylene/α-octene plastomer; about 30 to 50 wt % linear low density polyethylene; and about 5 to 25 wt % ethylene/vinyl acetate copolymer; and
   the composite comprises about 75 to 125 parts by weight magnesium dihydroxide; and about 35 to 50 parts by weight antimony trioxide.

32. The composite of claim 25, wherein the ethylene/α-olefin copolymer comprises ethylene/α-octene plastomer; the polyethylene comprises linear low density polyethylene; the olefin/unsaturated ester copolymer comprises ethylene/vinyl acetate copolymer and/or an ethylene/alkyl(meth)acrylate copolymer; the hydrated magnesium oxide comprises precipitated magnesium dihydroxide(MDH) having an average particle size of no more than about 2 microns; and the antimony compound comprises antimony trioxide.

33. The composite of claim 32, wherein a sheathing material formed from the composite exhibits one or more of the following properties:
   a tensile strength at break before aging of at least about 10 MPa (1500 lbf/in$^2$) (as determined pursuant to UL 44 Clause 4.2 & UL 44, Table 11);
   a decrease in tensile strength at break after air oven accelerated aging for 168 hours at 121° C. of no more than about 30% (as determined pursuant to UL 1277 (April, 2010));
   a tensile strength at break after accelerated aging for 96 hours at 100° C. in mineral oil (IRM 902) which is at least about 50% of its unaged tensile strength at break (as determined pursuant to UL 1277 (April, 2010));
   a tensile strength at break after accelerated aging for 60 days at 75° C. in mineral oil (IRM 902) which is at least about 65% of its unaged tensile strength at break (as determined pursuant to UL 1277 (April, 2010));
   an elongation at break before aging of at least about 150% (as determined pursuant to UL 44 Clause 4.2 & UL 44, Table 11);
   a decrease in elongation at break after air oven accelerated aging for 168 hours at 121° C. of no more than about 30% (as determined pursuant to UL 1277 (April, 2010));
   an elongation at break after accelerated aging for 96 hours at 100° C. in mineral oil (IRM 902) which is at least about 50% of its unaged elongation at break (as determined pursuant to UL 1277 (April, 2010));
   an elongation at break after accelerated aging for 60 days at 75° C. in mineral oil (IRM 902) which is at least about 65% of its unaged elongation at break (as determined pursuant to UL 1277 (April, 2010));
   a deformation of less than about 15% (XL jacket; 121.degree. C., 19.61 N load) (as determined pursuant to UL 1277 (April, 2010)); and
   a cable sheathed with a material formed from the composite exhibits no cracks or ruptures after being subjected to a cold bend test at −25° C. (as determined pursuant to UL 1277 (April 2010); and exhibits no cracks or ruptures after being subjected to a cold impact test at −40° C. (as determined pursuant to UL 1277 (April 2010); and
   a cable consisting of 9 copper insulated 12 AWG conductors sheathed with a material formed from the composite passes the Underwriter's Laboratory Vertical-tray test "Method 2" described in UL 2556 (March 2013).

34. The composite of claim 25, wherein a sheathing material formed from the composite exhibits the following properties:
   a tensile strength at break before aging of at least about 10 MPa (1500 lbf/in$^2$) (as determined pursuant to UL 44 Clause 4.2 & UL 44, Table 11);
   a decrease in tensile strength at break after air oven accelerated aging for 168 hours at 121° C. of no more than about 30% (as determined pursuant to UL 1277 (April, 2010));
   a tensile strength at break after accelerated aging for 96 hours at 100° C. in mineral oil (IRM 902) which is at least about 50% of its unaged tensile strength at break (as determined pursuant to UL 1277 (April, 2010));
   a tensile strength at break after accelerated aging for 60 days at 75° C. in mineral oil (IRM 902) which is at least about 65% of its unaged tensile strength at break (as determined pursuant to UL 1277 (April, 2010));
   an elongation at break before aging of at least about 150% (as determined pursuant to UL 44 Clause 4.2 & UL 44, Table 11);
   a decrease in elongation at break after air oven accelerated aging for 168 hours at 121° C. of no more than about 30% (as determined pursuant to UL 1277 (April, 2010));
   an elongation at break after accelerated aging for 96 hours at 100° C. in mineral oil (IRM 902) which is at least about 50% of its unaged elongation at break (as determined pursuant to UL 1277 (April, 2010));
   an elongation at break after accelerated aging for 60 days at 75° C. in mineral oil (IRM 902) which is at least about 65% of its unaged elongation at break (as determined pursuant to UL 1277 (April, 2010));
   a deformation of less than about 15% (XL jacket; 121.degree. C., 19.61 N load) (as determined pursuant to UL 1277 (April, 2010)); and
   a cable sheathed with a material formed from the composite exhibits no cracks or ruptures after being subjected to a cold bend test at −25° C. (as determined pursuant to UL 1277 (April 2010); and exhibits no cracks or ruptures after being subjected to a cold impact test at −40° C. (as determined pursuant to UL 1277 (April 2010); and
   a cable consisting of 9 copper insulated 12 AWG conductors sheathed with a material formed from the composite passes the Underwriter's Laboratory Vertical-tray test "Method 2" described in UL 2556 (March 2013).

35. The composite of claim 25, wherein the polymer material comprises about 30 to 50 wt % ethylene/α-olefin plastomer; about 30 to 50 wt % polyethylene; and about 5 to 25 wt % olefin/unsaturated ester copolymer; and the composite comprises about 75 to 125 parts by weight magnesium dihydroxide; and about 35 to 50 parts by weight antimony trioxide.

* * * * *